(12) United States Patent
Bruno et al.

(10) Patent No.: US 9,187,108 B2
(45) Date of Patent: Nov. 17, 2015

(54) FOLDING CART FOR PORTABLE GRILL

(71) Applicants: Adrian A. Bruno, Rolling Meadows, IL (US); Leonard Zelek, Chicago, IL (US); Anton Kalisiak, Palatine, IL (US); Paul Behnke, Mount Prospect, IL (US)

(72) Inventors: Adrian A. Bruno, Rolling Meadows, IL (US); Leonard Zelek, Chicago, IL (US); Anton Kalisiak, Palatine, IL (US); Paul Behnke, Mount Prospect, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 0 days.

(21) Appl. No.: 14/200,399

(22) Filed: Mar. 7, 2014

(65) Prior Publication Data

US 2015/0251678 A1    Sep. 10, 2015

(51) Int. Cl.
*A47J 37/07* (2006.01)
*B62B 1/20* (2006.01)
*B62B 1/22* (2006.01)

(52) U.S. Cl.
CPC .. *B62B 1/208* (2013.01); *B62B 1/22* (2013.01)

(58) Field of Classification Search
CPC .............................. B62B 1/12; B62B 2203/44
USPC ............ 280/651, 652, 47.35, 47.34; 126/9 R, 126/26, 30
See application file for complete search history.

(56) References Cited

U.S. PATENT DOCUMENTS

| | | | | |
|---|---|---|---|---|
| 3,147,748 A * | 9/1964 | Frank | | 126/9 R |
| 4,942,862 A | 7/1990 | Alden | | |
| 4,949,701 A * | 8/1990 | Krosp et al. | | 126/41 R |
| 5,318,322 A * | 6/1994 | Horne | | 280/645 |
| 5,791,331 A * | 8/1998 | Stewart | | 126/41 R |
| 6,257,229 B1 * | 7/2001 | Stewart et al. | | 126/276 |
| 6,422,230 B1 * | 7/2002 | Stewart et al. | | 126/25 R |
| 6,606,987 B2 * | 8/2003 | DeMars | | 126/38 |
| 6,684,877 B2 * | 2/2004 | Wu | | 126/41 R |
| 6,910,475 B2 * | 6/2005 | Zelek et al. | | 126/25 R |
| 7,438,071 B2 * | 10/2008 | Johnson et al. | | 126/25 R |
| 7,681,567 B2 * | 3/2010 | Chung | | 126/25 R |
| 7,753,046 B2 * | 7/2010 | Bruno et al. | | 126/25 R |
| 7,753,047 B1 * | 7/2010 | Trammell | | 126/50 |
| 7,958,882 B1 * | 6/2011 | Sgourides | | 126/9 R |
| 8,316,837 B2 * | 11/2012 | Malumyan | | 126/25 R |
| 8,505,528 B2 * | 8/2013 | Chien et al. | | 126/25 R |
| 2002/0020405 A1 * | 2/2002 | Coleman et al. | | 126/41 R |
| 2004/0112361 A1 * | 6/2004 | Zelek et al. | | 126/25 R |
| 2006/0021611 A1 * | 2/2006 | Johnson et al. | | 126/25 R |
| 2008/0196709 A1 | 8/2008 | Davis | | |

\* cited by examiner

*Primary Examiner* — Jeffrey J Restifo
(74) *Attorney, Agent, or Firm* — Niro, Haller & Niro (57) ABSTRACT

The present inventions relate to folding carts for use with grills, the carts securing the grill upright for use and folding for transport. The present inventions also relate to fuel tank support systems for use with grill carts or stands.

22 Claims, 7 Drawing Sheets

FOLDING CART FOR PORTABLE GRILL

FIELD OF THE INVENTION

The present inventions relate to folding or collapsible carts for grills. More particularly, the present inventions relate to folding or collapsible carts that securely support a grill and may be raised for use or collapsed for transport. The present inventions also relate to fuel tank support systems to secure the tank to the cart and above the ground.

BACKGROUND OF THE INVENTION

Grilling is extremely popular throughout the world. Increasingly, portability of grills is desired. For example, campers, boaters and the like desire to have a grill available on their outings. In addition, those that live in more densely populated areas desire to have a grill for their apartment or condominium, but do not have the space for a typical full sized grill. One example of a popular portable grill is described in U.S. Pat. No. 6,976,485 (assigned to Weber-Stephen Products LLC). Similar portable grills are sold by Weber under the trade names Q® 100 and Q® 200.

While portable grills are desirable, it is also desired to easily transport and conveniently use portable grills in a variety of different locations. Some users may simply transport the grill itself and may place the grill on a table top or the ground for use. Others may place the grill on a stand so that the grill may be conveniently used. However, moving the grill and a separate stand can be unwieldy, difficult and inconvenient. Thus, there is a need for a cart that can be used to securely support the grill during use and which may also be used to easily transport the grill to different locations for use. It is also become desirable to securely and safely transport portable grills from place to place, again, while also providing a support surface for convenient use of the grill.

Accordingly, it is an object of the present invention to provide a folding grill cart that folds for easy transport, can be pulled as a trolley similar to wheeled luggage and can be unfolded into an upright position for use.

Another object of the present invention is to provide a folding grill cart that supports the grill for use when in an unfolded and upright position.

An additional object of the present invention is to provide a folding grill cart that securely locks the grill to the cart for use and during transport.

A further object of the present invention is to provide a folding grill cart that locks into an unfolded position for use and is easily collapsed for transport.

Yet another object of the present invention is to provide a folding grill cart that includes a table top assembly, the table top assembly including toe clips into which the legs of a grill may slide into engagement.

Yet an additional object of the present invention is to provide a spring loaded lock button used in conjunction with the toe clips on the table top assembly to further secure the grill.

Yet a further object of the present invention is to provide a folding cart having a support frame assembly, the support frame assembly including leg lock members to secure the cart in an upright position.

Yet still a further object of the present invention is to provide a folding cart having a support frame assembly, the support frame assembly including leg lock members, at least one of which has a locking tab to secure the folding cart in an upright and locked position and to prevent undesired folding or collapse of the folding cart.

Still an additional object of the present invention is to provide a folding grill cart that accommodates a tank support assembly.

Still yet an additional object of the present invention is to provide a foldable tank support assembly to keep the fuel tank off of the ground.

Still another object of the present invention is to provide a folding grill cart that can accommodate a variety of portable grill sizes.

SUMMARY OF THE INVENTION

The present inventions preserve the advantages of known carts and fuel tank storage devices that may be used with portable or other grills, and also provide new features and advantages.

More particularly, the present inventions provide a folding cart for a grill, the grill having a lid with a handle and two pairs of legs, namely a right and left front leg and a right and left rear leg, and a foot portion associated with each leg. The folding cart includes a table top assembly for supporting and securing the grill, the table top assembly including two leg lock slots and two pairs of toe clips, namely a front right and left toe clip and a rear right and left toe clip, each toe clip capable of engaging a corresponding leg and associated foot portion of the grill. A support frame assembly having a first pair of collapsible legs and a second pair of collapsible legs, each leg having an upper and lower end, with the first and second pairs of legs pivotably connected between the upper and lower ends of the legs is also provided. In addition, the upper ends of the first pair of legs are pivotably mounted to a left side of the table top assembly and the lower ends of the first pair of legs terminate in a support end, and wherein the lower ends of the second pair of legs terminate in a support end and the upper ends of the second pair of legs include leg lock members for engagement with the leg lock slots of the table top assembly. The folding cart assembly also includes a handle assembly attached to the lower end of the first pair of legs.

The table top assembly of the present inventions may also include a toe lock mechanism to further secure the grill on the tabletop assembly and/or a manually operable locking tab on at least one leg lock member to further lock the legs to the table top assembly in the upright position. If desired, the handle assembly is collapsible and the toe lock mechanism spring loaded. A tank support system may also be provided, as well as a strap to secure the grill lid in a closed position. The folding cart assembly may include optional, additional pairs of toe clips and/or toe lock mechanisms. A base for the lower end of the first pair of legs and wheels for the lower ends of the second pair of legs is also an option with the present inventions.

The present inventions further provide a folding cart for transporting and using a portable grill having two front and two rear legs, each leg having a foot portion. Included is a table top assembly for supporting and securing the grill, the table top assembly having two leg lock slots and four toe clips, each toe clip spaced and sized to accommodate the legs of the grill and at least one toe lock mechanism; a support frame assembly having a first pair and a second pair of legs, each leg of each pair having an upper portion and a lower portion, the first and second pairs of legs pivotably connected to each other forming a scissor frame, the upper end of the first pair of legs are pivotably mounted to the table top assembly and the lower end of the first pair of legs includes a base and the lower end of the second pair of legs includes wheels and the upper end of the second pair of legs includes leg lock members for engagement in the leg lock slots of the table assembly; and a collapsible handle assembly. One leg lock member is also provided with a locking tab that may be manually released. A plurality of toe lock mechanisms may be provided, as well as a base including foot portions and an intermediate raised portion. The toe lock mechanism of the present invention may include a spring loaded button housed within a recess on the table top assembly. The handle assembly may include a pivot portion and a grip portion. Stops may also be provided on the lower portion of the first pair of legs to keep the handle assembly in the desired position. An optional tank support system having a frame member and a platform member may be included.

The present inventions also provide a tank support system for securing a fuel tank to a grill cart and above the ground or other support surface, the tank support system having a u-shaped frame member including a tank retention member and two hook portions to suspend said member from a support assembly of a grill cart. The tank support system also includes a platform support portion, one end being adapted to rest on an axle of said cart and the other end adapted to pivotably attach to a bottom portion of said u-shaped frame member. A skid plate may also be provided.

The present inventions further provide a table top assembly for supporting and securing a grill, the table top assembly including a generally flat surface; an opposing pair of front toe clips, namely a front right and left toe clip; an opposing pair of rear toe clips, namely a rear right and left toe clip; wherein each of the toe clips is adapted to engage a corresponding leg of the grill; and at least one toe lock mechanism. In addition, each of the toe clips has an opening facing a front or rear of the table so that the legs of the grill may be slid into engagement with the toe clips. The toe lock mechanism may also include a spring loaded button.

Inventor's Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The folding cart of the present inventions is shown generally as 10 in the Figures. It is intended for use with portable grills 12, such as the Q® 100 and Q® 200 products of Weber-Stephen Products LLC. It will be understood by those of skill in the art that the present inventions are applicable to grills of other manufacturers and other grill types, including gas and charcoal. It will also be understood by those of skill in the art that the various features and components are sized, spaced and oriented to accommodate the particular type of grill(s) for which the present inventions are contemplated. It will also be understood that the components of the present invention may be made out of a variety of materials, such as aluminum, stainless steel and/or plastic, consistent with the function and environment of the components.

The assemblies of a preferred folding cart 10 include a support frame assembly 20, a table top assembly 40 and a handle assembly 60. Alternative embodiments may also include a tank support system 80 (FIGS. 6 and 7), which may be used with other stands or carts or in combination with folding cart 10 of the present inventions. For convenience, the present inventions will be described by reference to their use with a portable Weber® grill, such as the Q® 100 or Q® 200 products. As shown, for example, in FIGS. 1 and 1B, a typical portable grill 12 includes a pair of right legs 14 and a pair of left legs 16. As used herein for ease of reference and to describe the relationship of the various components, right and left are referenced in relation to the front or cooking side of the grill 12, but the present inventions are clearly not limited thereto. Similarly, front and rear are referenced herein in relation to the front and rear of grill 12. The pairs of right legs 14 and left legs 16 of grill 12 terminate in generally flat right feet 11 and generally flat left feet 13. Legs 14, 16 and feet 11, 13 are slidably received in and secured to table top assembly 40 by toe clips 51-54 and toe lock mechanism 41 as hereinafter described. Grill 12 also typically includes a lid 15, a lid handle 17, a left side handle 19 and a right side handle 18.

By reference to FIGS. 1, 1B, 4-4C and 5, a preferred embodiment of the scissor-type support frame assembly 20 may be seen. A first pair of collapsible legs 22 and a second pair of collapsible legs 24 are provided. The two pairs of legs 22, 24 are pivotably attached to one another approximately halfway down their respective length at pivot point 25, forming a scissor-type frame similar to that of conventional ironing boards. It will be understood by those of ordinary skill in the art that a variety of means 25 to interconnect and pivot leg pairs 22 and 24 may be used. For example, tubular rivets and a pre-formed plastic cover are preferred for pivot point 25 as shown generally in FIGS. 1 and 1A. In addition, although preferred, the pairs of legs don't have to be connected approximately halfway down their length. Moreover, it is within the scope of the present invention to have legs that are not pivotably connected to each other but instead, extend downward from their point of attachment to table top assembly 40.

The tops 26 of legs 22 may be pivotably connected to the underside of table top assembly 40 by pins (not shown) or other means known to those of skill in the art. For example, various pivot support members (not shown) may be preformed on the underside of table top assembly 40. In the preferred embodiment, the tops 26 of legs 22 are pivotably attached to the left side of table top assembly 40. As indicated, it will be understood by those of skill in the art that attachment on the left side is merely exemplary. The bottom or lower ends 27 of legs 22 extend downward to the right so that they may be supported on the ground.

Figure 1:
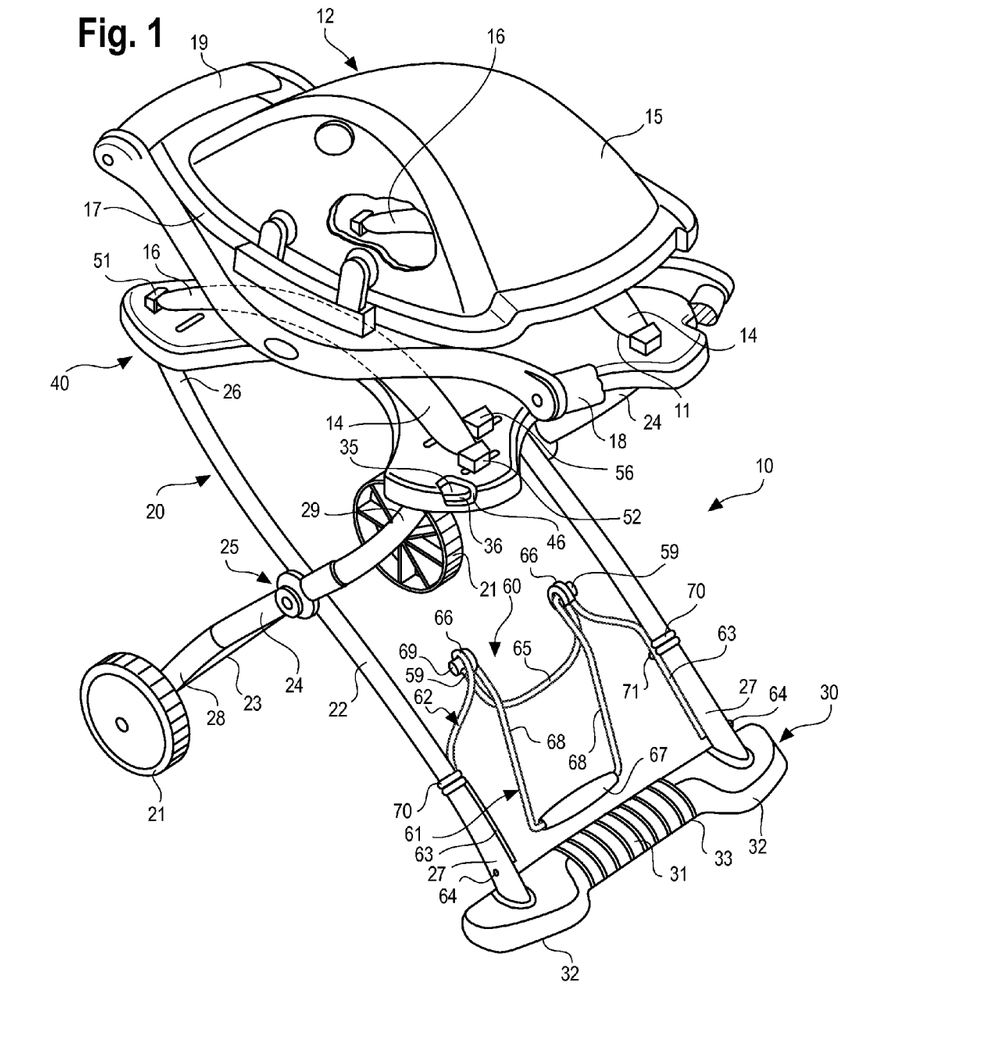
FIG. 1 is a perspective view of a preferred embodiment of a folding cart assembly of the present invention in an unfolded and locked position for use shown supporting a representative portable grill.
Figure 1A:
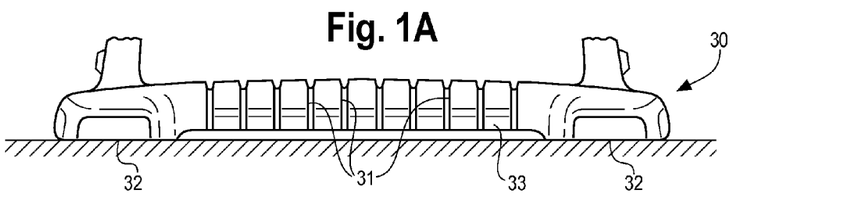
FIG. 1A is a front perspective view of a preferred support frame base of the present invention.

In a preferred embodiment, a base 30 is attached to the bottom ends 27 of legs 22 (see also FIG. 1A). Base 30 includes a tread portion 31, feet portions 32 and a raised portion 33. In general, base 30 provides extra stability and helps prevent undesired movement of folding cart 10 when it is in its upright and locked position for use. Feet portions 32 of base 30, in conjunction with raised portion 33, help to accommodate slightly uneven surfaces, such as porch decking. Tread portion 31 may be used as a foot stand to more easily raise and lower the folding cart 10 as hereinafter described (see FIG. 4). It will be understood by those of skill in the art that the base 30 is optional. For example, the bottom 27 of legs 22 may be provided with pads or caps (not shown).

Each leg of the second pair of legs 24 includes a lower end 28 that extend upward to the right side of table top assembly 40 to an upper end 29. In a preferred embodiment, lower ends 28 are provided with wheels 21 which are connected to an axle 23 that extends between the lower ends 28 of legs 24. Axle 23 may pass through holes (not shown) on lower end 28 such that wheels 21 may be rotatably attached to axle 23. It will be understood by those of skill in the art that wheels 21 may be attached to the axle 23 by a variety of well known means. Bearings and the like (not shown) may also be provided to aid in rotation of wheels 21 or axle 23. It will be understood by those of skill in the art that no axle 23 for wheels 21 is necessary. For example, wheels 21 may be casters or have their own integral axles, etc. It will also be understood that no wheels 21 are necessary for the present inventions, although they are preferred so that the folding cart 10 and grill 12 are easily transported as hereinafter described.

Leg lock members 35 are provided on the upper ends 29 of legs 24. Leg lock members 35 are received in leg lock slots 46 of table top assembly 40 (see FIGS. 4, 4A, 4B and 4C). When leg lock members 35 are received within leg lock slots 46, the support frame assembly 20 and the associated grill 12 on table top assembly 40 are in the upright position for use. The weight of grill 12 pushing down on legs 22 and 24 helps retain leg lock members 35 in the leg lock slots 46. Leg lock members 35 are sized to fit within leg lock slots 46 and are attached to the tops 29 of legs 24 by a pin 34 or other well known means. Leg lock members 35 include a nose portion 36 that mates with and is received in leg lock slots 46. FIG. 4C shows the preferred embodiment of leg lock mechanism 35 without the optional locking tab 37 as discussed below.

Figure 4:
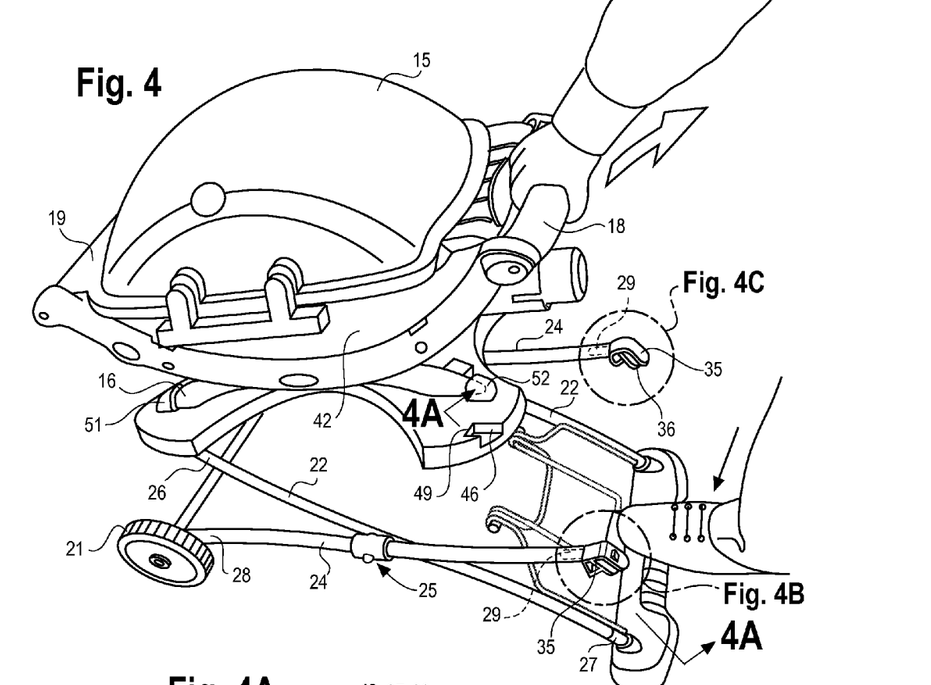
FIG. 4 is a perspective view of a preferred embodiment of a folding cart of the present invention shown in an intermediate position between the upright and locked position for use and the collapsed or transport position.
Figure 4A:
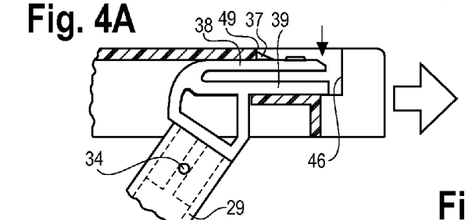
FIG. 4A is a cross-sectional view of a preferred embodiment of a leg lock member having a locking tab shown in an installed position in a preferred leg lock slot of the table top assembly taken along line 4A-4A of FIG. 4.
Figure 4B:
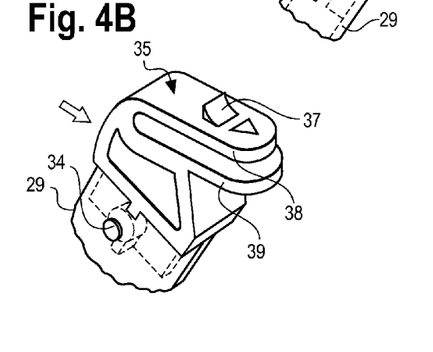
FIG. 4B is a perspective view of the preferred leg lock member having a locking tab taken from insert 4B of FIG. 4.
Figure 4C:
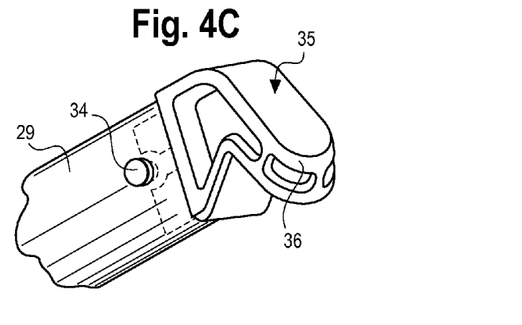
FIG. 4C is a perspective view of a preferred leg lock member not having a locking tab taken from insert 4C of FIG. 4.

In a preferred embodiment, and as shown in FIGS. 4, 4A and 4B, at least one leg lock member 35 includes a manually operable locking tab 37. The locking tab 37 prevents the folding cart 20 and grill 12 from unintended collapse when in the upright position for use. To collapse or fold cart 20 for transport, the leg lock members 35 cannot be moved out of leg lock slots 46 without manual release of the locking tab 37 present on at least one leg lock member 35. In the preferred embodiment, leg lock member 35 has a top portion 38 and a bottom portion 39 (FIGS. 4A and 4B). Locking tab 37 is attached to top portion 38. Because there is a space between the top 38 and bottom 39 portions, they may be squeezed together or top 38 pressed downward toward bottom portion 39 as shown in FIG. 4A to release locking tab 37 from a shoulder portion 49 of table top assembly 40. Thus, when folding cart 10 is in an upright and locked position (FIG. 1), leg lock members 35 are within leg lock slots 46. Locking tab 37 is biased upward and engages a shoulder portion 49 of leg lock slot 46. This keeps folding cart 10 in an upright position even if the assembly is bumped or moved. To unlock the leg lock member having locking tab 37, and collapse the folding cart 10, the user may press the top 38 of top portion 39 downward (FIG. 4A). This lowers locking tab 37, which is then able to clear the shoulder portion 49 of leg lock slots 46 so that the lock members 35 may be disengaged from leg lock slots 46 and the folding cart 10 collapsed or lowered for transport.

It will be understood by those of skill in the art that locking tab 37 may take a variety of shapes and/or engage a variety of shoulder portions 49 of leg lock slots 46. Similarly, leg lock slots 46 may also be of shapes different than that shown, as long as they mate with or are complimentary to leg lock members 35. In addition, it is not necessary to have locking tabs 37 on either leg lock member 35, although at least one leg lock member 35 with a locking tab 37 is preferred. Similarly, both leg lock members 35 may be provided with a locking tab 37 or similar locking structure.

Other components and features of preferred table top assembly 40 may better be seen by reference to FIGS. 2, 2A, 2B, 2C, 3 and 3A. Table top assembly 40 includes a generally flat support surface 42 to accommodate legs 14 and 16 of grill 12. It will be understood by those of skill in the art that table top assembly 40 and support surface 42 can take a variety of shapes, including rectangular and square. The preferred quatrefoil, curvilinear or rounded rectangle shape as shown, for example, in FIGS. 2 and 3, accommodates all of the components of the present inventions and conserves material costs and reduces weight. It will also be understood by those of ordinary skill in the art that a variety of materials may be used to make table top assembly 40. Plastic is generally preferred, as selected components, some of which are discussed herein, may be integrally formed on or as part of the table top assembly 40, as will be understood by those of skill in the art.

Figure 2:
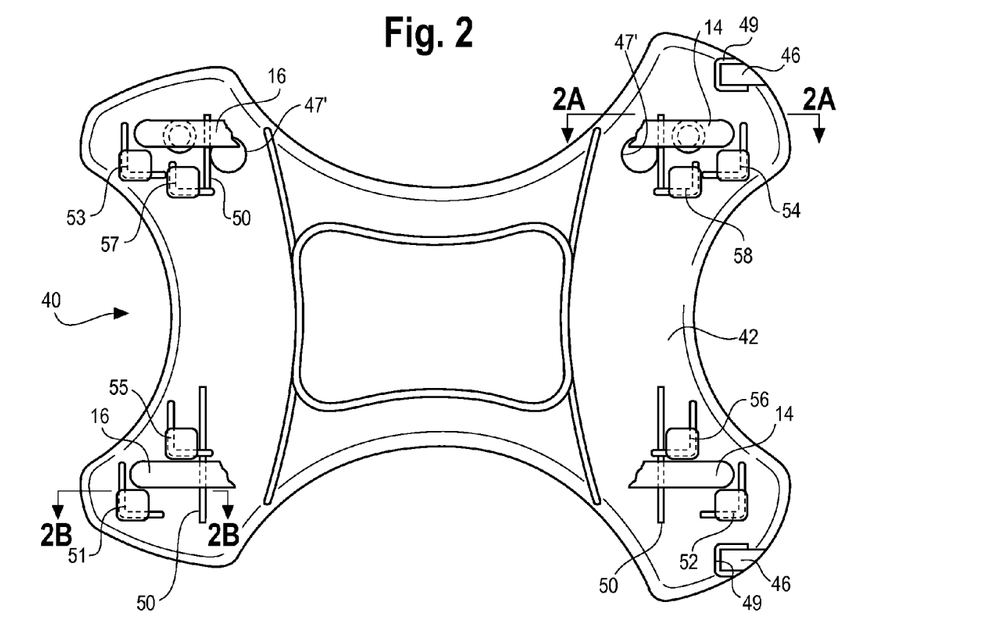
FIG. 2 is a top plan view of a preferred table top assembly of the present invention shown with representative grill legs in an installation position prior to being slid into engagement with preferred toe clips of the present invention.
Figure 2A:
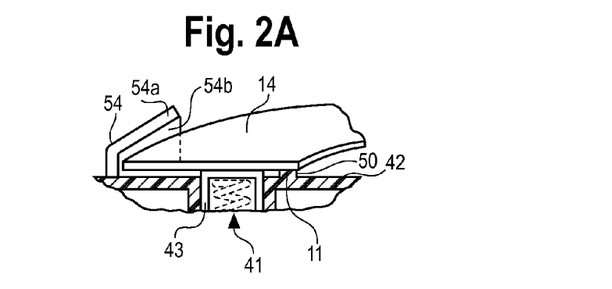
FIG. 2A is a cross-sectional view of a preferred right rear toe clip and a preferred toe lock mechanism shown in an installation position with the right rear foot of the right grill leg depressing a lock button of the toe lock mechanism of the present invention taken along line 2A-2A of FIG. 2.
Figure 2B:
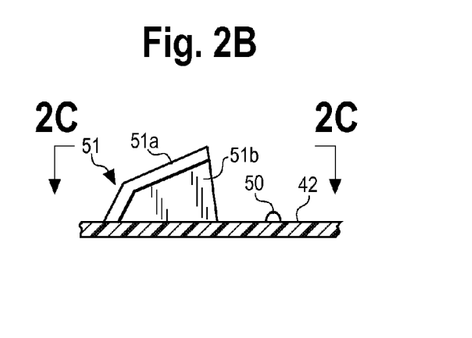
FIG. 2B is a cross-sectional view of a preferred left front toe clip of the present invention taken along line 2B-2B of FIG. 2.
Figure 2C:
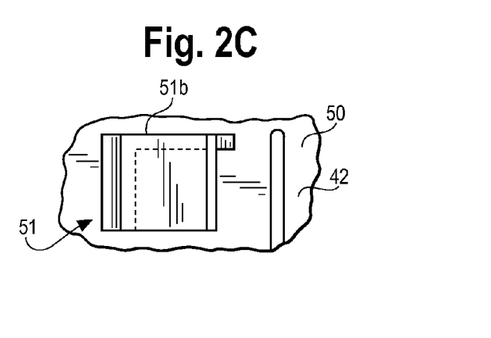
FIG. 2C is a top plan view of the preferred toe clip of FIG. 2B.
Figure 3:
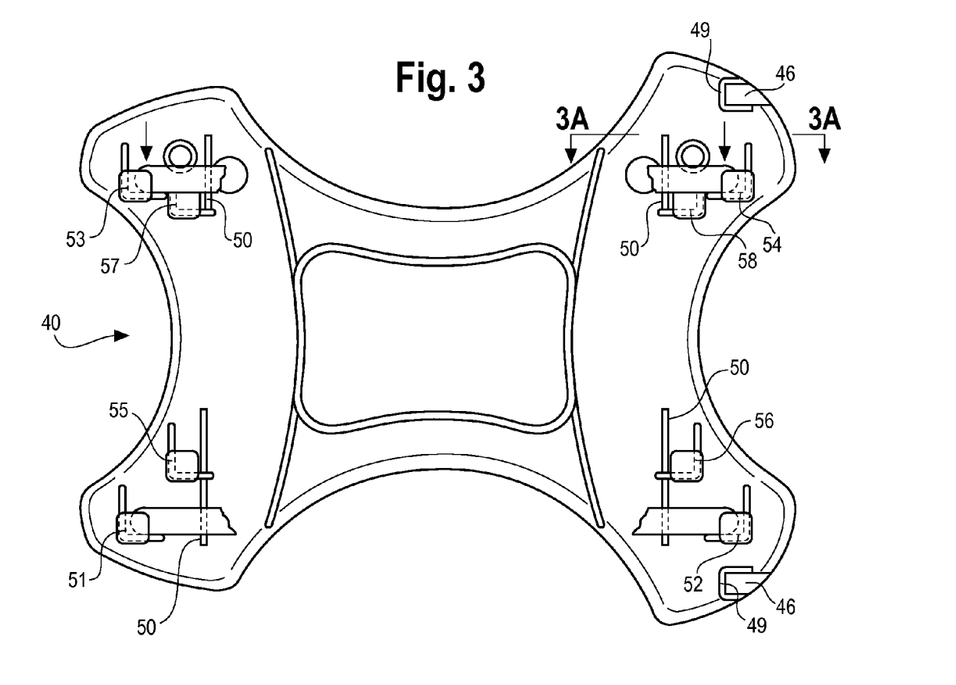
FIG. 3 is a top plan view of a preferred table top assembly of FIG. 2 shown with representative grill legs in an installed or locked position within the corresponding toe clips engaged or locked for transport or use.
Figure 3A:
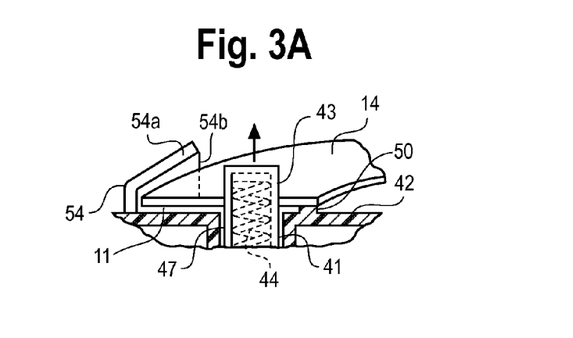
FIG. 3A is a cross-sectional view of the preferred right rear toe clip of FIG. 3 shown with the lock button in a locked position, the foot of the right rear grill leg having cleared the lock button such that the grill is in a locked or use position taken along line 3A-3A of FIG. 3.

Support surface 42 is provided with two opposing pairs of toe clips 51, 52, 53 and 54 that are used to engage and secure the legs 14 and 16 of grill 12. More specifically, in a preferred embodiment, there is a front opposing pair of toe clips 51 and 52 and a rear opposing pair of toe clips 53 and 54 (FIGS. 2 and 3). Each toe clip 51, 52, 53 and 54 is of a similar construction and includes a top member 51a, 52a, 53a and 54a and a side member 51b, 52b, 53b and 54b (see FIGS. 2B and 2C showing left front toe clip 51). The top and side members of each toe clip 51-54 create a recess or pocket that accepts the bottom of legs 14 and 16 and their associated feet 11 and 13 of grill 12. All of the recesses open in the same direction so that feet 11 and 13 may be slid into engagement with the toe clips 51, 52, 53 and 54. In order to make it easier to slide feet 11 and 13 of grill 12 along support surface 42, a glide track 50 is provided adjacent to each of the toe clips 51-54. In a preferred embodiment, glide tracks 50 are formed onto support surface 42. It will be understood by those of skill in the art that glide tracks 50 may be separate components made from a variety of suitable materials. Alternatively, glide tracks 50 may be a suitable coating or anti-friction material applied to support surface 42.

Thus, the toe clips function to restrain the legs 14 and 16 and hence grill 12 from moving left or right, up and down or forward. Legs 14 and 16 are preferably restrained against undesired rearward movement by toe lock mechanism 41 as hereinafter described. It will be understood by those of skill in the art that toe clips 51, 52, 53 and 54 are preferably shaped to closely mimic the geometry of legs 14 and 16 (and feet 11 and 13) of grill 12. It will be understood by those of skill in the art that toe clips 51-54 may have different configurations. For example, toe clips 51-54 could be a hood-type structure having no side walls (51b-54b) and just a top member (51a-54a). Such a configuration would prevent vertical movement of grill 12. In addition, in the preferred embodiment, toe clips 51-54 are integrally formed as part of support surface 42. However, toe clips 51-54 may be constructed as separate components which are attached to the support surface 42 and/or made out of a variety of materials.

Figures 1B, 1C, 1D:
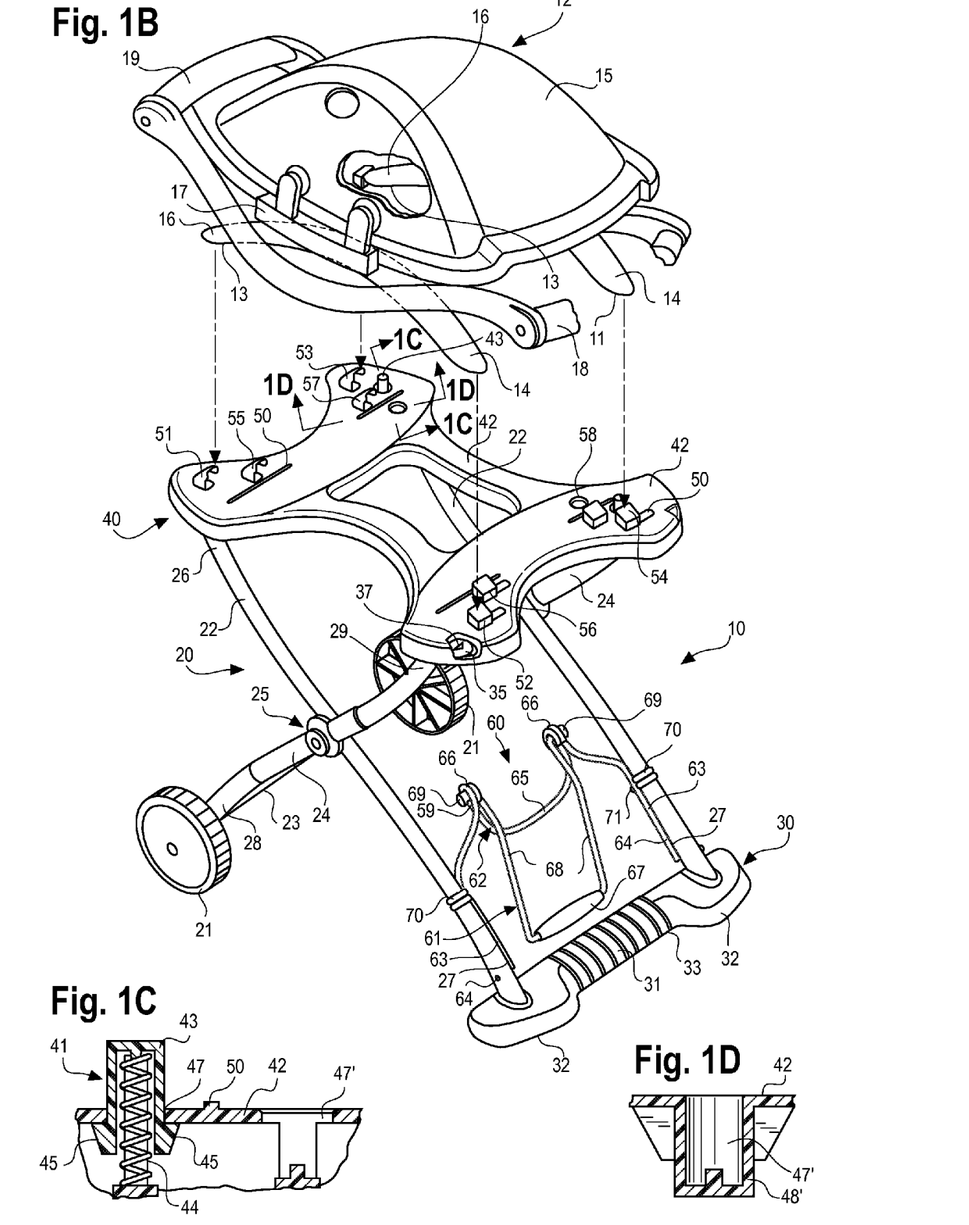
FIG. 1B is a perspective view of the folding cart of FIG. 1 showing placement of the portable grill onto a preferred embodiment of a preferred table top assembly.
FIG. 1C is a cross-sectional view of a preferred toe lock mechanism of the present invention, also showing an optional additional aperture for an optional additional toe lock mechanism taken along line 1C-1C of FIG. 1B.
FIG. 1D is a cross-sectional view of the optional additional aperture for an optional additional toe lock mechanism taken along line 1D-1D of FIG. 1B.

In a preferred embodiment, an additional set of opposing pairs of toe clips 55, 56, 57 and 58 are also optionally provided to table top assembly 40 (FIGS. 1B, 2 and 3). These additional toe clips are spaced on support surface 42 to accommodate a different size grill 12 having legs 14 and 16 that are spaced differently. In this manner, one table top assembly 40 may accommodate grills 12 of different sizes and/or leg configurations. A guide track 50 may also be provided with any additional toe clips 55-58.

Toe clips 51-54 (and support surface 42) prevent vertical movement of grill 12. In the preferred embodiment, side members 51a-54a of toe clips 51-54 prevent forward horizontal movement of grill 12. In order to more securely lock grill 12 to table 42 and prevent undesired horizontal movement of the grill toward the rear of table 42, one or more toe lock mechanisms 41 are provided (see FIGS. 1B, 1C and 1D; 2 and 2A; 3 and 3A). Preferably, spring loaded toe lock mechanism 41 includes a lock button 43, a spring 44 and two depressible flanges 45 that are part of or provided on the lock button 43 (see FIGS. 1, 1C, 1D, 2A and 3A). Lock button 43 and spring 44 are housed within a recess 47 provided for each toe lock mechanism 41 that is incorporated on table top assembly 40. Preferably, there is a toe lock mechanism 41 associated with rear right toe clip 54 and one associated with rear left toe clip 53. Each recess 47 is provided with a u-shaped member 48 (see FIGS. 1C and 1D) which serves as a base for spring 44 of lock button 43. The bottom of spring 44 is supported on the bottom by u-shaped member 48 and is engaged at the top by lock button 43. Lock button 43 is held within recess 47 by flanges 45 of lock button 43. Lock button 43 is normally biased upward by the spring 44 as shown in FIG. 1C (see also FIG. 3A).

When it is desired to lock grill 12 to table 42 and prevent rearward movement of grill 12, the grill 12 is placed on the table 42 to the rear of the rearwardly facing recess openings of toe clips 51, 52, 53 and 54. Foot 13 of left rear grill leg 16 and foot 11 of right rear grill leg 14 depress lock button 43 when the feet 11 and 13 are placed on top of them. The depression of lock button 43 associated with toe clip 54 by foot 11 of right leg 14 is shown in FIG. 2A. Left rear foot 13 of left rear leg 16 similarly depresses the other lock button 43 associated with toe clip 53. In this manner, grill 12 may be slid forward so that feet 11 and 13 of legs 14 and 16 fit within the recesses of toe clips 51, 52, 53 and 54. Once feet 11 and 13 of legs 14 and 16 clear spring loaded lock button 43 (see FIG. 3A), spring 44 urges button 43 upward into a locked position. This completely locks the grill 12 to table 42 and prevents rearward movement. When it is desired to remove grill 12, buttons 43 are depressed and feet 11 and 13 slide rearwardly over the buttons 43 thereby releasing the grill.

As indicated, each recess 47 includes a u-shaped retaining member 48 extending below table 42 (FIGS. 1C and 1D). Because the retaining member is u-shaped having two open sides, depressible tabs 45 of lock button 43 are accessible by the user below table 42. Thus, to remove lock button 43 from recess 47, tabs 45 are squeezed together by the user so that button 43 (and spring 44) may be removed from recess 47. As indicated, in the preferred embodiment, there is one toe lock mechanism 41 associated with the rearwardly facing recess of one pair of opposing toe clips, i.e., toe clips 53 and 54 as shown in FIGS. 2 and 3. In this manner, legs 14 and 16 of grill 12 are locked from rearward horizontal movement and the side members 51b-54b prevent forward horizontal movement. If additional toe clips 55, 56, 57 and 58 are provided, additional apertures 47' associated with those optional clips may also be provided (see FIGS. 1B, 1C, 1D and 3). Button 43 and spring 44 may be removed from aperture 47 by the user as described and reinserted into additional aperture 47'. Thus, only one set of lock buttons 43 and springs 44 is needed even if additional sets of toe clips 55-58 are provided.

To aid in transportation of folding cart 10 (and typically grill 12), a folding handle assembly 60 is provided (FIGS. 1, 1B, 4 and 5). In a preferred embodiment, folding handle assembly 60 is made from two pieces; namely, a grip portion 61 and a pivot portion 62. Pivot portion 62 includes two legs 63 that terminate at the lower end to form pivot arms 64, which extend at a right angle to legs 63. Pivot arms 64 are pivotably attached to the lower end 27 of legs 22. As shown in FIGS. 1 and 1B, pivot arms 64 are inserted through a hole in the lower end 27 of legs 22. In addition to being simple, in this manner, the whole handle assembly 60 may be removed for cleaning by simply removing pivot arms 64 from the holes in legs 22. It will be understood by those of skill in the art that there are a variety of ways to pivotably attach legs 63 of pivot portion 62 to legs 22. Again, by reference to the preferred embodiment, the upper end of pivot portion 62 is formed into a u-shaped portion 65 including two loops 66. As shown, the u-shaped portion 65 only permits handle portion 61 to pivot one way upward and prevents it from swinging below pivot portion 62.

Preferred grip portion 61 includes a hand grip 67 and two legs 68. Legs 68 terminate in two pivot points 69. Pivot points 69 are designed to fit within loops 66 of pivot portion 62. Bearings 59 may be provided in loops 66 to aid the pivoting of grip portion 61 in pivot portion 62. A pair of mechanical stops 70 having clips 71 are attached to legs 22. Stops 70 and clips 71 function to keep pivot portion 62 aligned with legs 22 and from pivoting downward and falling behind legs 22. As indicated, u-shaped portion 65 also functions to keep handle portion 61 from swinging too far downward. In this manner, the handle assembly 60 is easily accessible and does not interfere with the folding or unfolding of cart assembly 10. Although the above described handle assembly 60 is preferred, the configurations of handle assembly 60 may be utilized. For example, the handle assembly 60 shown and described is formed from wire. It will be understood that other materials and methods of construction are contemplated. In addition, it is not required to have a two piece handle assembly 60 or to have one that pivots.

Having described the principal components of a preened embodiment, the use and operation of folding cart 10 will be described. Initially, folding cart 10 is placed in an open or use position by inserting leg lock members 35 into leg lock slots 46 of table top assembly 40 (FIG. 1B). In the preferred embodiment, locking tab 37 on the one leg lock member 35 engages a shoulder portion 49 of table top assembly 40 adjacent to leg lock slots 46, so that the leg assembly 20 is then in an upright and locked position.

Grill 12 is then placed on support surface 42 at a position rearward of the rearwardly facing recesses of toe clips 51, 52, 53 and 54 and with right rear foot 11 and left rear foot 13 of grill 12 depressing lock button 43 (FIGS. 2 and 2A). The feet 11 and 13 depress lock button 43 into recess 47 so that the user may slide grill 12 forward toward the front of table 42 until feet 11 and 13 are engaged in toe clips 51, 52, 53 and 54. Once feet 11 and 13 are slid past and over lock buttons 43, the spring loaded lock buttons 43 are urged upward (see FIGS. 3 and 3A). Lock buttons 43 prevent grill 12 from being moved rearward on table 42. Folding cart 10 and grill 12 are now in an upright and locked use position as shown in FIG. 1.

When transport of the grill 12 using folding cart 10 is desired, grill 12 and table top assembly 40 are lowered as shown in FIG. 4. In the preferred embodiment, this is accomplished by depressing lock tab 37 of leg lock member 35 so that legs 24 may be released from leg lock slots 46. As shown in FIG. 4, the user may place a foot on tread portion 31 of base 30 and grab grill unit handle 18, lowering folding cart 10 to a collapsed or folded position (see FIG. 5).

Figure 5:
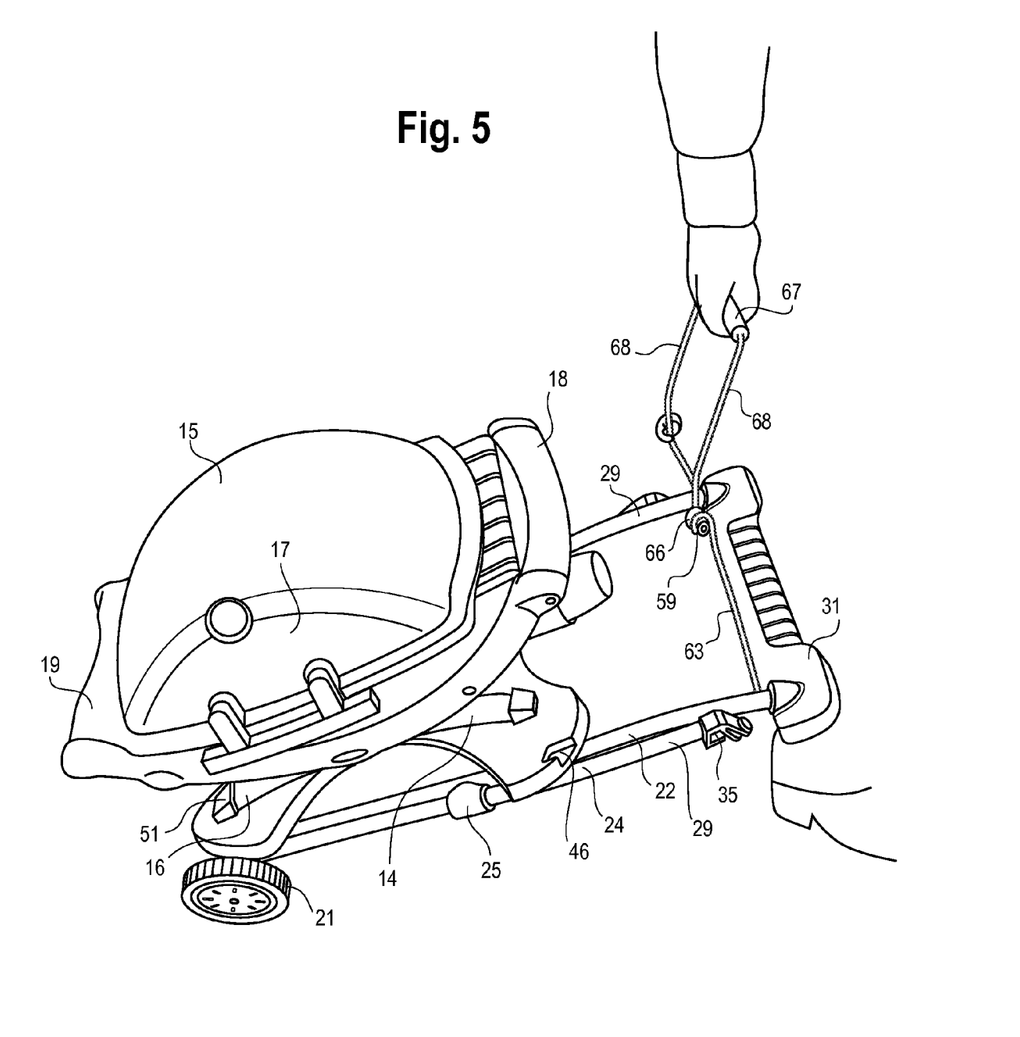
FIG. 5 is a perspective view of a preferred embodiment of a folding cart assembly of the present invention shown with a representative grill secured to the table top assembly in a collapsed and transport position.

To transport folding cart 10 and grill 12, the user grasps grip portion 67 of handle assembly 60. This causes grip portion 61 to rotate upward. As a result, pivot portion 62 disengages from clips 71 of stop 70 and rotates forward to a comfortable transport position as shown in FIG. 5. The user may then lift the front end of folding cart 10 so that the unit pivots on wheels 21 and may be easily transported.

When it is desired to again use the grill, the user may place a foot on tread portion 31 of base 30 and may simultaneously pull unit handle 18 of grill 12. This causes upper end 29 of legs 24 (as well as upper end 26 of legs 22) to rotate upward. Once table top assembly 40 clears the upper end 29 of legs 24, the table may be slightly lowered so that leg lock members 35 are engaged in leg lock slots 46. Locking tab 37 then snaps into place and the folding cart is in an upright and locked position for use of grill 12 (FIG. 1).

Figure 6:
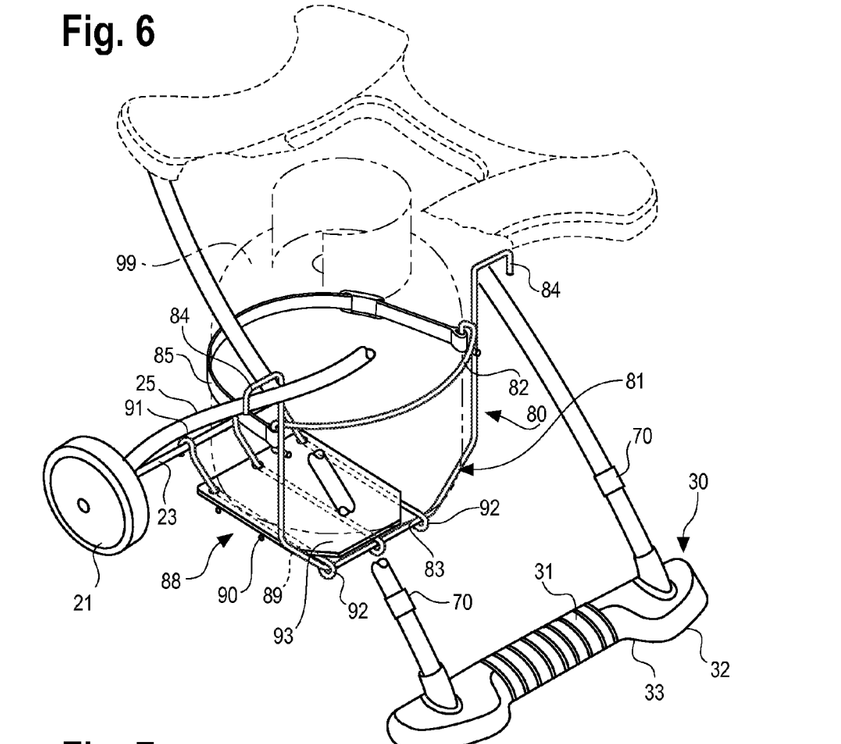
FIG. 6 is a perspective view of a preferred embodiment of a tank support system of the present invention with portions of the folding cart assembly removed and/or shown in phantom line.
Figure 7:
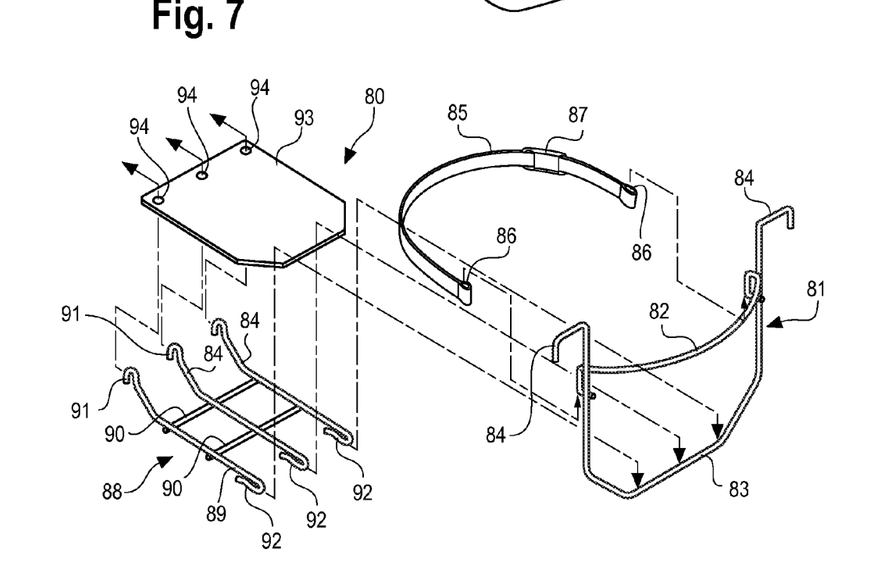
FIG. 7 is an exploded perspective view of the preferred tank support system of FIG. 6.

In some situations, it may be desirable or even required by certain laws to support a fuel source 99 with the grill stand or table and above the ground. To accommodate this, a tank support system 80 may be provided and may be used in conjunction with folding cart assembly 10 of the present invention. Tank support system 80 may also be used with other tables, stands or carts for grills. A preferred embodiment of tank support system 80 is shown in FIGS. 6 and 7. Tank support system 80 includes a u-shaped frame member 81 and an interconnecting tank retention member 82. The lower end of u-shaped frame member 81 includes a platform support portion 83. Each upper end of u-shaped member 81 includes an outwardly facing hook portion 84 that is sized to fit over pivot point 25 of support frame assembly 20 if used with some of the embodiments of the present inventions. A tank strap 85 is also provided. Tank strap 85 includes a loop 86 at each end. Loops 86 are placed over and secured to u-shaped member 81. A buckle 87 or other well known means to open and close tank strap 85 is also provided.

Tank support assembly 80 also includes a base frame 88 having three support members 89. Two cross members 90 provide additional strength and stability. One end of each support member 89 is provided with or formed into an open and downwardly facing hook 91 and the other ends provided with means to attach members 89 to the lower portion 83 of u-shaped member 81. As shown, clamped hooks 92 are provided as the means that enable the ends of support members 89 to be secured in a generally non-removable yet pivotable fashion. For ease of assembly, shipment and storage, clamped hooks 92 may pivot about lower portion 83 of u-shaped member 81. A skid plate 93 is also provided which fits over support members 89 with holes 94. It will be understood by those of skill in the art that skid plate 93 is optional, may simply lay over support members 89 or be attached thereto by other means. It will also be understood by those of skill in the art that u-shaped frame member 81 and/or base frame member 88 may take a variety of forms consistent with the present inventions.

To use the preferred tank support system 80 with a preferred embodiment, hook portions 84 are placed over pivot point 25. Downwardly facing hooks 91 are then placed over axle 23. The other ends of members 89 are supported by the lower portion 83 of u-shaped member 81. In this manner, base frame 88 and its associated platform 93 form the support for tank 99. To secure tank 99 in tank support assembly 80, strap 85 is unbuckled 87, the tank placed on skid plate 93, strap 85 is then placed around tank 99 and rebuckled. Tank 99 is then secured to support frame assembly 20 and held above the ground, deck or other surface. In addition, because the preferred embodiment uses open hooks 91 that are supported by axle 23, clamped hooks 92 that are secured to the lower platform support member 83 and hook portion 84, the tank support system 80 may be collapsed, folded or removed for transport or shipping and may also be used on other stands or carts.

The above description is not intended, to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A folding cart for a grill, the grill having a lid with a handle and two pairs of legs, namely a right and left front leg and a right and left rear leg, and a foot portion associated with each leg, the folding cart comprising:
   a table top assembly having an upper support surface for supporting and securing the grill, the table top assembly including two leg lock slots and two pairs of toe clips, namely a front right and front left toe clip and a rear right and rear left toe clip, each toe clip projecting above the upper support surface of the table top assembly and capable of engaging a corresponding foot portion of each leg of the grill;
   a support frame assembly having a first pair of collapsible legs and a second pair of collapsible legs, each leg of each pair having an upper end and a lower end, the first and second pairs of legs pivotably connected approximately halfway between the upper and lower ends of the legs, wherein the upper end of the first pair of legs is pivotably mounted to a left side of the table top assembly and the lower end terminates in a support end, and wherein the lower end of the second leg terminates in a support end and the upper end of the second pair of legs terminate in an upper end which includes leg lock members for releasable engagement with the leg lock slots of the table top assembly; and
   a handle assembly.

2. The folding cart of claim 1 wherein said table top assembly includes at least one toe lock mechanism having a lock button that projects above the support surface of the table top assembly.

3. The folding cart of claim 2 wherein the lock button of the toe lock assembly is spring loaded.

4. The folding cart of claim 2 wherein a plurality of toe lock mechanisms, each having a lock button projecting above the support surface of the table top assembly, are provided.

5. The folding cart of claim 1 wherein said at least one leg lock member includes a locking tab.

6. The folding cart of claim 1 wherein the handle assembly is pivotable and collapsible.

7. The folding cart of claim 1 wherein a tank support system is provided.

8. The folding cart of claim 1 wherein a strap to secure the grill lid in a closed position is provided.

9. The folding cart of claim 1 wherein an additional two pairs of toe clips is provided on the table top assembly and which project above the upper support surface of the table top assembly.

10. The folding cart of claim 1 wherein the lower end of the first pair of legs includes a base.

11. The folding cart of claim 1 wherein the lower end of the second pair of legs includes wheels.

12. A folding cart for transporting and using a portable grill having two front and two rear legs, each leg having a foot portion, the folding cart comprising:
    a table top assembly having a generally flat upper surface for supporting and securing the grill, the table top assembly including two leg lock slots and four toe clips, each toe clip projecting above the support surface and adapted to accommodate the corresponding legs of the grill and further including at least one toe lock mechanism having a lock button that projects above the support surface; and
    a support frame assembly having a first pair of legs and a second pair of legs, each leg of each pair having an upper portion and a lower portion, the first and second pairs of legs pivotably connected to each other forming a scissor frame, wherein the upper end of the first pair of legs is pivotably mounted to the table top assembly and the lower end of the first pair of legs includes a base and wherein the lower end of the second pair of legs includes wheels and the upper end of the second pair of legs includes leg lock members for selectively releasable engagement in the leg lock slots of the table assembly.

13. The folding cart of claim 12 wherein one leg lock member is provided with a locking tab that may be manually released.

14. The folding cart of claim 12 wherein a plurality of toe lock mechanisms are provided.

15. The folding cart of claim 12 wherein the base includes feet portions and raised portions.

16. The folding cart of claim 12 wherein the toe lock mechanism includes a removable spring loaded button, portions of which are housed in a recess on the table top assembly.

17. The folding cart of claim 12 wherein a collapsible handle assembly is provided and wherein the handle assembly includes a pivot portion and a grip portion.

18. The folding cart of claim 17 wherein stops are provided on the lower portion of the first pair of legs to keep the handle assembly in the desired position.

19. The folding cart of claim 12 including a tank support system.

20. The folding cart of claim 19 wherein the tank support system includes a frame member and a platform portion.

21. A table top assembly for supporting and securing a grill having two pairs of legs, namely a right and left front leg and a right and left rear leg, and a foot portion associated with each leg, the table top assembly comprising:
    a generally flat upper support surface;
    an opposing pair of front toe clips, namely a front right and left toe clip;
    an opposing pair of rear toe clips, namely a rear right and left toe clip;
    wherein each of said toe clips includes a top member projecting above the upper support surface and a side member projecting above the upper support surface such that the top and side members of each toe clip create an opening above the upper support surface, each toe clip opening accepting a corresponding leg of the grill; and
    at least one toe lock mechanism associated with at least one toe clip, the toe lock mechanism including a lock button that projects above the upper support surface.

22. The table top assembly of claim 21 wherein each of said toe clips has an opening facing a front or rear of said table such that all of the openings face in the same direction so that the legs of the grill may be slid into engagement with the toe clips.

* * * * *